(12) United States Patent
Cailleteau et al.

(10) Patent No.: US 12,060,907 B2
(45) Date of Patent: Aug. 13, 2024

(54) METHOD FOR ASSEMBLING A METAL PART WITH A COMPOSITE PART AND CORRESPONDING ASSEMBLY OF PARTS

(71) Applicant: Safran Seats, Plaisir (FR)

(72) Inventors: Jérémy Cailleteau, Saint Août (FR); Thomas Meyer, Saint Ismier (FR)

(73) Assignee: Safran Seats, Plaisir (FR)

( * ) Notice: Subject to any disclaimer, the term of this patent is extended or adjusted under 35 U.S.C. 154(b) by 853 days.

(21) Appl. No.: 16/636,262

(22) PCT Filed: Jul. 13, 2018

(86) PCT No.: PCT/EP2018/069079
§ 371 (c)(1),
(2) Date: Feb. 3, 2020

(87) PCT Pub. No.: WO2019/025159
PCT Pub. Date: Feb. 7, 2019

(65) Prior Publication Data
US 2020/0309176 A1    Oct. 1, 2020

(30) Foreign Application Priority Data

Aug. 3, 2017 (FR) .................................... 1770825

(51) Int. Cl.
*F16B 5/06* (2006.01)
*F16B 5/07* (2006.01)

(52) U.S. Cl.
CPC .... *F16B 5/0635* (2013.01); *F16B 2005/0678* (2013.01); *F16B 5/07* (2013.01)

(58) Field of Classification Search
CPC ........ F16B 5/0096; F16B 5/07; F16B 5/0056; F16B 5/0635; F16B 2005/0678;
(Continued)

(56) References Cited

U.S. PATENT DOCUMENTS 304,249 A  * 8/1884  Wilcox ............... B63H 9/08
135/33.4
1,854,843 A  * 4/1932  Janes ................. A47G 27/0418
24/683

(Continued)

FOREIGN PATENT DOCUMENTS

DE      102013205745 A1   10/2014
FR          3021899 A1    12/2015

OTHER PUBLICATIONS

"Kiln-dried VS. Heat-treatment—What's the Difference?" by Herwood Inc., Mar. 5, 2013, [online], [retrieved on Nov. 8, 2023] Retrieved from the Internet <URL:https://hwppallets.com/news/kiln-dried-vs-heat-treatment-%E2%80%93-what-s-the-difference-50.aspx>.*

(Continued)

*Primary Examiner* — Amber R Anderson
*Assistant Examiner* — Kevin J Baynes
(74) *Attorney, Agent, or Firm* — Kilpatrick Townsend & Stockton LLP

(57) ABSTRACT

The invention relates to a method for assembling a first metal part with a second part made of a composite material comprising at least one matrix and fibers arranged inside the matrix. The method comprises at least:
  a step of forming the first part, consisting in producing a plurality of teeth projecting from a contact face of the first part, two adjacent teeth being separated from each other by an interstitial space, the teeth having an end protuberance; and
  a step of pressing the second part against the first part, in such a way that the fibers of the composite material can penetrate inside the interstitial space defined between adjacent teeth and that the fibers are retained by the end protuberances of the teeth.

15 Claims, 6 Drawing Sheets

(58) Field of Classification Search
CPC ........ F16B 5/0088; F16B 5/01; F16B 11/002; F16B 15/0023; F16B 15/003; F16B 15/00046; Y10T 403/4974; Y10T 24/45775
See application file for complete search history.

(56) References Cited

U.S. PATENT DOCUMENTS

| | | | | |
|---|---|---|---|---|
| 2,974,378 | A * | 3/1961 | Lidsky | F16B 15/0046 411/467 |
| 3,090,088 | A * | 5/1963 | Wood | F16B 15/0046 411/467 |
| 3,529,507 | A * | 9/1970 | Adams | F16B 15/0046 411/467 |
| 3,667,337 | A * | 6/1972 | Burke | F16B 15/0046 411/467 |
| 4,641,401 | A * | 2/1987 | Hasegawa | A44B 17/0076 24/108 |
| 4,679,367 | A * | 7/1987 | Geisthardt | F16B 15/0046 144/353 |
| 4,679,749 | A * | 7/1987 | Ryan | B64D 11/064 297/15 |
| 5,312,456 | A * | 5/1994 | Reed | H01L 23/5385 257/E29.022 |
| 5,788,247 | A * | 8/1998 | Tensor | F16J 15/122 29/888.3 |
| 7,802,799 | B1 | 9/2010 | Semmes | |
| 9,909,605 | B2 * | 3/2018 | Baker | B29C 66/8322 |
| 10,801,535 | B2 * | 10/2020 | Brunk | F16B 37/048 |
| 2007/0261224 | A1 * | 11/2007 | McLeod | B29C 37/0082 29/428 |
| 2008/0003401 | A1 * | 1/2008 | Barnes | B29C 66/45 428/99 |
| 2013/0149501 | A1 | 6/2013 | Pacchione et al. | |
| 2015/0290903 | A1 * | 10/2015 | Tresse | B29C 70/86 264/249 |
| 2015/0343742 | A1 * | 12/2015 | Roemer | B29C 66/742 428/458 |
| 2017/0217061 | A1 | 8/2017 | Roche et al. | |

OTHER PUBLICATIONS

"Wood-Plastic Composite Technology" Gardner et al. Current Forestry Reports, vol. 1, pp. 139-150, Apr. 6, 2015, [online], [retrieved on [Nov. 1, 2024] Retrieved from the Internet <URL:https://link.springer.com/article/10.1007/s40725-015-0016-6>. (Year: 2015).*
International Patent Application No. PCT/EP2018/069079, English Translation of the Written Opinion of the International Searching Authority, dated Nov. 29, 2019.
International Patent Application No. PCT/EP2018/069079, International Preliminary Report on Patentability Chapter I, dated Feb. 4, 2020.
International Patent Application No. PCT/EP2018/069079, International Search Report (and English translation) dated Sep. 11, 2018.

* cited by examiner

METHOD FOR ASSEMBLING A METAL PART WITH A COMPOSITE PART AND CORRESPONDING ASSEMBLY OF PARTS

The present invention relates to a method for assembling a metal part with a part made of a composite material and to an assembly of corresponding parts.

Within the context of manufacturing a product, structural assemblies may need to be made between a metal part and a part made of a composite material comprising fibers embedded in a matrix of polymer material. The assembly between the two parts can be performed, for example, by bonding or by means of a fastening insert.

The document FR3021899 describes an assembly between a metal plate and a plate made of a composite material with fibrous reinforcement. An assembly face of the metal part comprises coupling forms consisting of a plurality of pins substantially perpendicular to the assembly face. In addition, a layer, called locking layer, made of a material comprising a polymer matrix, is overmolded on the assembly.

However, such a method has the disadvantage of requiring an injection operation to be performed to obtain the additional locking layer. Such an injection operation is time-consuming to implement and generates significant manufacturing costs.

In addition, the assembly of parts obtained according to such a method does not have sufficient mechanical strength for specific uses that need to withstand significant forces.

The present invention aims to effectively overcome these disadvantages by proposing a method for assembling a first metal part with a second part made of a composite material comprising at least one matrix, in particular made of polymer, and fibers arranged inside the matrix.

More specifically, the first part and the second part are intended to be assembled along their contact face.

The method comprises at least:
- a step of forming the first part, consisting in the production of a plurality of teeth projecting from a contact face of the first part, two adjacent teeth being separated from each other by an interstitial space, the teeth having an end protuberance; and
- a step of pressing the second part against the first part, in such a way that the fibers can penetrate inside the interstitial spaces defined between adjacent teeth of the first part and that the fibers are retained by the end protuberances of the teeth.

According to one embodiment, the method further comprises:
- a step of heating the second part that is performed before the pressing step; and/or
- a cooling step that is performed after the mechanical pressing step, in particular intended to allow the consolidation of the assembly between the first part and the second part.

According to one embodiment, the cooling step is performed under pressure.

According to one embodiment, the step of heating the second part can be performed by infrared, ultrasound, or induction, or using an oven.

A further aim of the present invention is an assembly comprising a first metal part and a second part made of a composite material comprising at least one matrix, in particular made of polymer, and fibers arranged inside the matrix.

According to an alternative embodiment, the first part and the second part are able to be assembled along their contact face.

More specifically, the first part comprises a plurality of teeth projecting from a base in connection with a contact face of the first part and comprising a free end, opposite the base, having an end protuberance. The end protuberance forms a means of retaining the fibers of the composite material when the first part and the second part are assembled.

In addition, the tooth can comprise at least one circumferential protuberance.

Furthermore, the free end of the tooth can have a width that is greater than a width of a central part of the tooth and/or the width of the central part of the tooth is less than a width of the base of the tooth.

In addition, two adjacent teeth can be separated from each other by an interstitial space. The interstitial space is able to receive fibers of the composite material when the first part and the second part are assembled.

In addition, the interstitial space can have a minimum width at the free end of the tooth and/or at least a contraction in width in a direction of extension of the tooth.

According to one embodiment, the first part comprises a through opening. The through opening allows the matrix of composite material to creep therethrough. Such a feature reinforces the mechanical connection between the first part and the second part.

In this case, the teeth advantageously originate from an edge of the through opening and/or are angularly spaced apart from each other in an even manner along a circumference of the opening.

In such a configuration, the teeth are advantageously angularly spaced apart from each other in an even manner along a circumference of the through opening.

Alternatively, the teeth can originate from a free end edge of the first part.

According to another embodiment, the tooth is extended by a point arranged at the free end of the tooth.

According to one embodiment, the assembly between the first part and the second part is performed by means of at least one point attachment zone or a linear attachment zone.

According to a particular embodiment of the present invention, the first part and the second part are parts of an airplane seat.

The present invention thus allows, by virtue of the shape of the teeth, the composite part to be structurally connected to the metal part, whilst ensuring effective retention of the fibers inside the interstitial spaces when a force is applied on the assembled parts.

In addition, the method according to the present invention is economical since it is based on the simple production of teeth by punching, laser cutting, or stamping.

The present invention also has the advantage of not having to use additional material (glue, intermediate insert or overmolding layer) to enable assembly and of not requiring surface preparation.

Compared to methods based on the installation of an insert, the present invention further allows a weight saving to be made by enabling direct assembly between the composite part and the metal part without an intermediate element.

Of course, the various features, variations and/or embodiments of the present invention can be associated with each other in various combinations to the extent that they are not incompatible or mutually exclusive.

The present invention will be better understood, and further features and advantages will become apparent, upon reading the following detailed description comprising embodiments that are provided for illustrative purposes with reference to the appended figures, which are presented by way of non-limiting examples, which may be used to complete the understanding of the present invention and the disclosure of its actualization and, where appropriate, to contribute to its definition, in which figures.

It should be noted that, in the figures, the structural and/or functional elements common to the various embodiments have the same reference signs. Thus, unless otherwise stated, such elements have identical structural, dimensional and material properties.

Figure 1A:
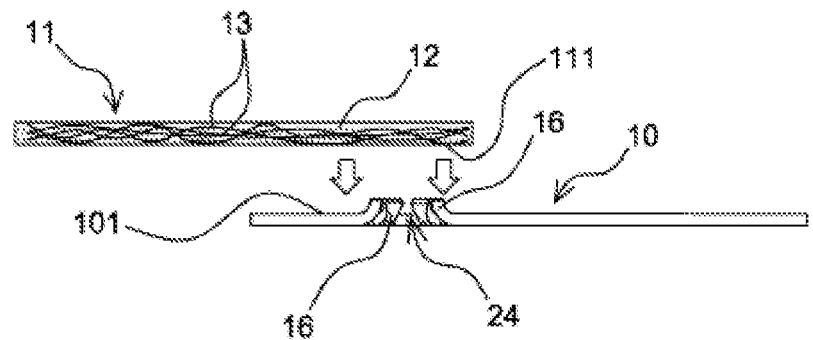
FIGS. 1a and 1b are side views of a composite part and of a metal part, respectively before and after assembly.
Figure 1B:
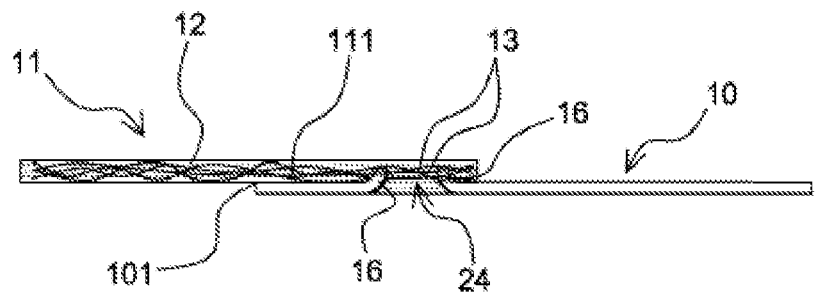

FIGS. 1a and 1b illustrate an assembly according to the present invention between a first part 10, made of a metallic material, and a second part 11, made of a composite material. The composite material of the second part 11 comprises at least one matrix 12, in particular a polymer, and fibers 13 arranged inside the matrix 12.

The first part 10, or metal part 10, comprises at least one contact face 101. The second part 11, or composite part 11, comprises at least one contact face 111. According to the present invention, the metal part 10 and the composite part 11 are intended to be assembled along their contact face 101, 111 by overlapping with each other. The metal part 10 is thus intended to come into contact with the composite part 11 through its contact face 101; and the composite part 11 is intended to come into contact with the metal part 10 through its contact face 111.

In addition, the metal part 10 comprises a plurality of teeth 16 projecting from the contact face 101 of the metal part 10. Preferably, the teeth 16 project in a direction perpendicular to the contact face 101 of the metal part 10. When the metal part 10 and the composite part 11 are arranged so as to be assembled together, the teeth 16 are directed toward the composite part 11.

Figure 2:
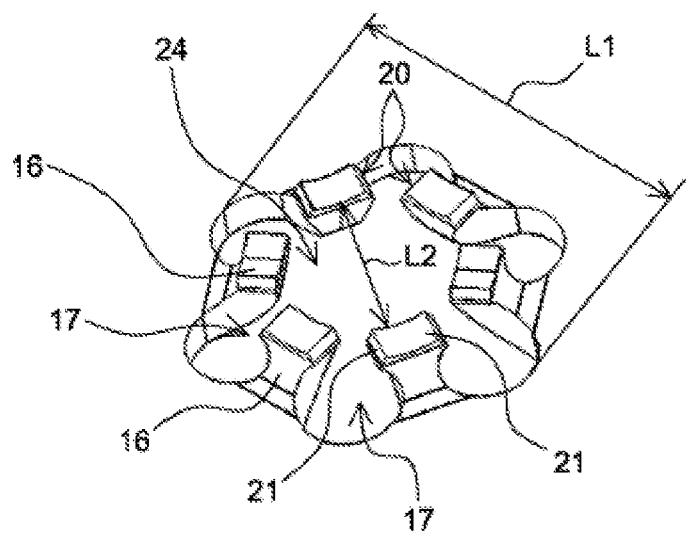
FIG. 2 is a perspective view of teeth produced on one face of the metal part according to the present invention.
Figure 3:
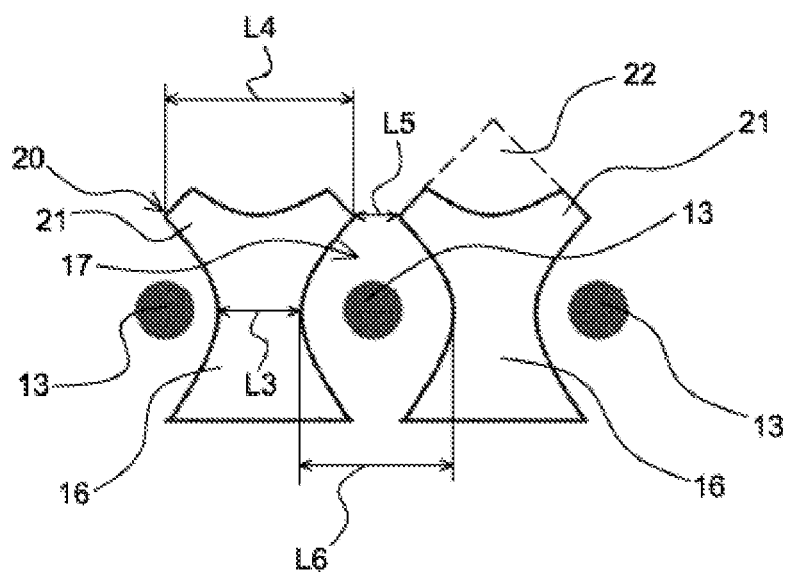
FIG. 3 is a schematic side view illustrating the insertion of fibers inside the interstitial spaces between the teeth provided on the face of the metal part of the assembly according to the present invention.

As can be seen, in particular, in FIGS. 2 and 3, two adjacent teeth 16 of the metal part 10 are separated from each other by an interstitial space 17. The interstitial space 17 is particularly intended to allow the passage of the fibers 13 of the composite part 11.

Furthermore, the tooth 16 advantageously has an end protuberance 20 able to allow the fibers 13 to be retained inside the immediately adjacent interstitial space 17. The end protuberance 20 thus forms a retaining means advantageously located at a free end of the tooth 16, arranged opposite a base of the tooth 16 in connection with the contact face 101 of the metal part 10. Thus, the tooth 16 extends in a direction of extension of the tooth from the base toward the free end thereof.

Preferably, the end protuberance 20 is produced to minimize the loss of volume to avoid decompaction of the composite material of the composite part 11. However, it would also be possible to provide a shape in the tooling to promote compaction. To this end, a first tool is shaped to press the fibers 13 against the metal part 10 and a second tool is shaped to limit the creep of the matrix of the composite part 11 inside an opening 24 as much as possible, which opening is described in further detail hereafter.

In the example shown in FIGS. 2 and 3, each tooth 16 has circumferential protuberances 21. The circumferential protuberances 21 correspond to a local enlargement of the tooth 16. Advantageously, the tooth 16 comprises circumferential protuberances 21 extending circumferentially on either side of the tooth 16.

Due to such a configuration, the tooth 16 has a greater width on the side of their free end than in their central part. Thus, a width of the interstitial space 17 between two teeth 16 tends to decrease when moving from the central part of the interstitial space 17 toward an upper opening of the interstitial space 17, located on the side of the free end of the teeth 16.

Advantageously, the teeth 16 originate from an edge of a through opening 24 produced in the metal part 10. This edge is located in the thickness of the part 10.

During the assembly of the metal part 10 and the composite part 11, the matrix 12 of the composite material creeps into the through opening 24 of the metal part 10. The creep of the matrix 12 of the composite material into the through opening 24 of the metal part 10 strengthens the connection between the metal part 10 and the composite part 11.

In addition, according to one embodiment, the teeth 16 originate from an edge delimiting the through opening 24 of the metal part 10. Thus, there is a continuity of material between the teeth 16 and the edge delimiting the through opening 24. Advantageously, yet not essentially, the teeth 16 are angularly spaced apart from each other in an even manner along a circumference of the through opening 24 of the metal part 10. Such a distribution of the teeth 16 allows transmission of normal and tangential forces at 360 degrees.

Furthermore, the teeth 16 are advantageously arranged symmetrically, so that there is an invariance in rotation of the pattern formed by the teeth 16. More specifically, the invariance in rotation is observable when the pattern is rotated by an angle equal to 360 degrees divided by the number of teeth, equal to 6 according to the example shown in FIG. 2.

Of course, the number of teeth 16, and therefore the order of the invariance in rotation of the pattern, can vary and be adapted according to the application and, in particular, the level of the forces to be withstood.

In a particular embodiment, depicted by the broken lines in FIG. 3, the free end of the tooth 16 can end in a point 22. The pointed shape 22 of the tooth 16 improves the penetration of the tooth 16 inside the composite material, in particular inside the spaces between the fibers 13 of the composite material.

In an embodiment as shown in FIG. 2, the through opening 24 can have:
- an external diameter L1, measured at the bottom of the interstitial spaces 17; and
- an internal diameter L2, measured at an internal periphery of the teeth 16.

According to a non-limiting example, the external diameter L1 can be of the order of 12.5 mm, plus or minus 0.5 mm, and/or the internal diameter L2 can be of the order of 4.5 mm, plus or minus 0.5 mm.

In a particular definition as shown in FIG. 3, the tooth 16 can have:
- a minimum width L3, measured at the smallest width of the tooth 16, for example, at the central part of the tooth 16; and
- a maximum width L4, measured at the widest width of the tooth 16, for example, at the free end of the tooth 16.

According to a non-limiting example, the minimum width L3 can be of the order of 1 mm, plus or minus 0.5 mm, and/or the maximum width L4 can be of the order of 2.7 mm, plus or minus 0.5 mm.

In an alternative embodiment as shown in FIG. 3, the interstitial space 17 can have:
- a minimum width L5, measured at the smallest width of the interstitial space 17, for example, at the free end of the tooth 16; and
- a maximum width L6, measured at the largest width of the interstitial space 17, for example, at the central part of the tooth 16.

According to a non-limiting example, the minimum width L5 can be between 1 and 20 times, preferably between 1 and 5 times, an average diameter of the fibers 13 of the composite material of the second part 11 and/or the maximum width L6 can be between 1 and 100 times, preferably between 1 and 10 times, the diameter of the fibers 13 of the composite material of the second part 11.

In addition, the minimum width L5 of the interstitial space 17 can be of the order of 1 mm, plus or minus 0.5 mm, and/or the maximum width L6 of the interstitial space 17 can be of the order of 2 mm, plus or minus 1 mm.

Advantageously, a height of the tooth 16 is substantially equal to or slightly less than a thickness of the composite part 11.

Furthermore, the matrix 12 of the composite material of the second part 11 is produced from a polymer material, in particular a thermoplastic polymer material, in particular from thermoplastic polycarbonate, from PPS (polyphenylene sulfide), from PEEK (polyether ether ketone), from PEI (polyetherimide), or from polyamide. Alternatively, the matrix 12 of the composite material of the second part 11 can, however, be made of a thermosetting polymer material.

Figure 4:
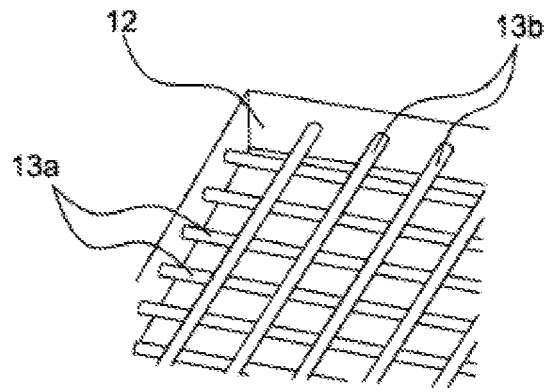
FIG. 4 is a perspective view of a layer of fibers of the composite part used in the assembly according to the present invention.
Figure 5:
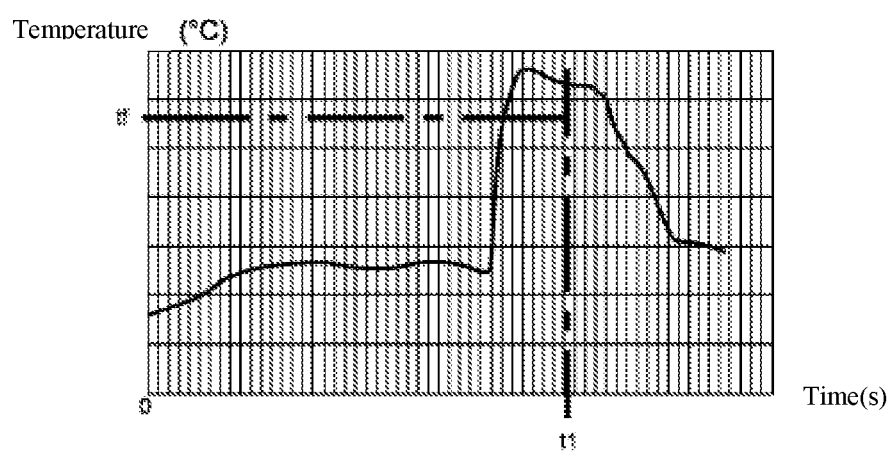
FIG. 5 is a graphic representation of the evolution of the temperature of a part made of a composite material as a function of time during a heating step.

Preferably, the composite material of the second part 11 comprises fibers 13, in particular of the satin type, for example, of the 8H satin weave, twill or taffeta type, arranged in a mesh of fibers, in which the fibers 13 are interleaved together, as illustrated in FIG. 4.

A distinction is made between a first set of fibers 13a, in which the fibers 13 are advantageously parallel to each other, and a second set of fibers 13b, in which the fibers 13 are advantageously parallel to each other and/or perpendicular to the fibers of the first set of fibers 13a. In one embodiment, four layers of fibers 13 are used, for example, having a thickness of 0.5 mm, that is, a total thickness of 2 mm. Alternatively, the fibers 13 can be in a knitted, woven or non-woven arrangement. In the case where the fibers are woven, all weaves can be used.

Figure 7:
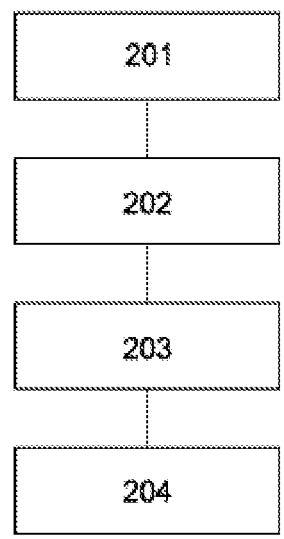
FIG. 7 is a diagram of the different steps of a method for assembling between a metal part and a part made of a composite material according to the present invention.

A description is provided hereafter, with reference to FIG. 7, of the various steps of an embodiment of a method for assembling between the metal part 10 and the composite part 11 according to the present invention. The metal part 10 can, for example, be an aluminum part having the advantage of being easily deformable in order to produce the desired shapes.

In a first step 201, or forming step 201, the teeth 16 and/or the through opening 24 of the metal part 10 are produced, for example, by stamping, 3D punching, 2D or laser cutting-punching, and/or stamping. The first step 201 allows the teeth 16 to be formed so that they project relative to the contact face 101 of the metal part 10.

During a second step 202, or heating step 202, the composite part 11 is heated until it reaches a temperature tf somewhere between a glass transition temperature and a melting temperature of the composite material. The temperature tf is, for example, obtained at an instant t1. The temperature tf is such that the composite material, in particular the matrix, is sufficiently softened to be penetrated by the teeth 16. The temperature tf, which depends on the composite material, is generally greater than 200° C.

The heating step 202 can be performed by means of a furnace, by infrared, ultrasound, or induction, or by means of an oven.

Figure 8A:
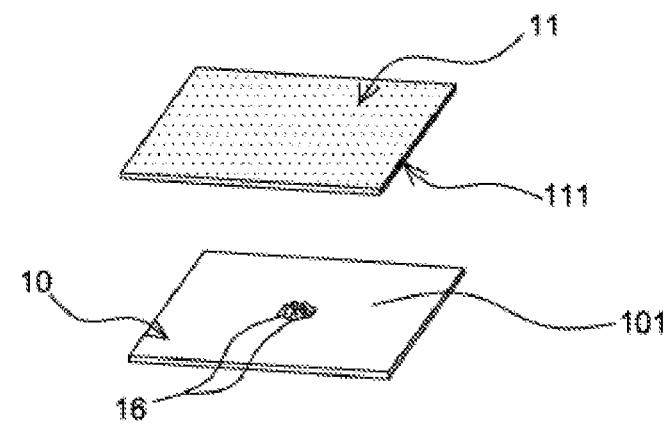
FIGS. 8a to 8c illustrate the steps of assembling the part made of a composite material with the metal part according to the present invention.
Figure 8B:
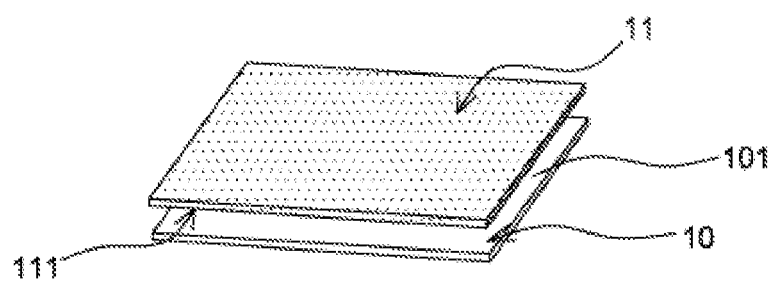
Figure 8C:
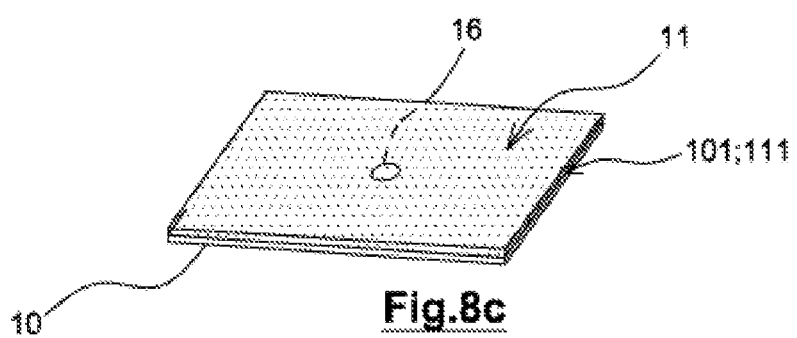

As illustrated in FIGS. 8a to 8c, while the matrix 12 of the composite part 11 is in a viscous state at the end of the heating step 202, a third step 203, or pressing step 203, in particular a mechanical pressing step 203, ensures that the teeth 16 penetrate inside the spaces between the fibers 13 of the composite part 11, so that the fibers 13 of the composite material are inserted inside the interstitial spaces 17. In addition, the matrix 12 creeps so as to fill the interstitial spaces 17 and the opening 24 during compression. The pressing step 203 is, for example, performed under a pressure that advantageously is between 5 and 10 bars.

Figure 9:
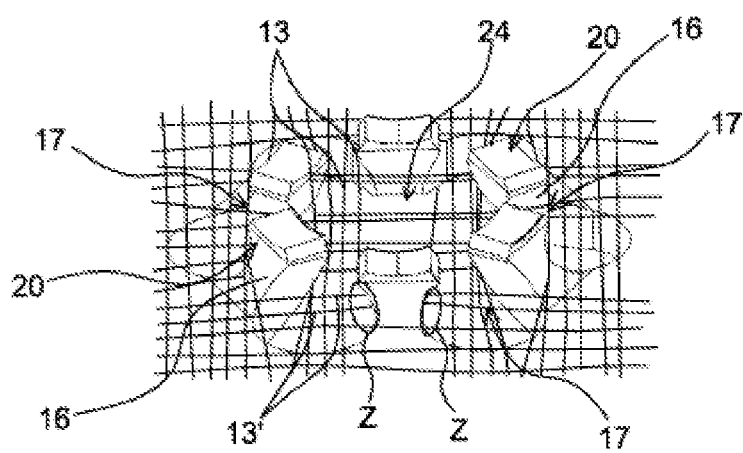
FIG. 9 is a perspective view of the assembly of the part made of a composite material and of the metal part according to the present invention.

As shown in FIG. 9, the consequence of the penetration of the teeth 16 inside the spaces between the fibers 13 of the composite part 11 is that the fibers 13 have moved relative to each other and are consolidated and locally concentrated in zones Z located at the edge of teeth 16. In addition, it can be seen that the same fiber, such as the fibers referenced 13' in FIG. 9, can interact with several teeth 16 (three teeth in the example shown), which therefore helps mechanical retention.

Subsequently, a fourth step 204, or cooling step 204, consolidates the assembly between the metal part 10 and the composite part 11. Preferably, the cooling step 204 is very short in order to obtain a rigid assembly. The duration of the cooling step thus can be, for example, less than 30 seconds. Advantageously, the cooling step 204 is implemented while maintaining an application pressure, in particular identical to that exerted during the pressing step 203.

It should be noted that the assembly according to the method described above does not require any specific surface preparation of the composite part 11 and/or of the metal part 10.

It should also be noted that, in the case where the matrix 12 is made of a thermosetting polymer material, it is possible to omit the step 202 of heating and/or the step 204 of cooling the composite part 11.

The mechanical strength obtained by virtue of the method according to the present invention is equivalent to or greater than that of an assembly by bonding or riveting.

The mechanical strength of the assembly thus obtained is of the order of 150 daN in traction and 500 daN in shear. Such mechanical strength is greater than that obtained with methods incorporating:
- an overmolding of a locking layer, which exhibits strength of the order of 60 daN in traction and 100 daN in shear;
- the use of standard inserts in composite panels, which exhibits strength of the order of 144 daN in shear and 200 daN in shear; or
- assembly by bonding, which exhibits strength of the order of 75 daN in traction and 450 daN in shear.

Advantageously, the metal part 10 and the composite part 11 are airplane seat parts.

In the example of FIGS. 1a, 1b, 2, and 3, the teeth 16 are produced according to a so-called point configuration, i.e. they originate from an internal edge of a small diameter through opening 24 provided in the metal part 10.

Figures 6A, 6B:
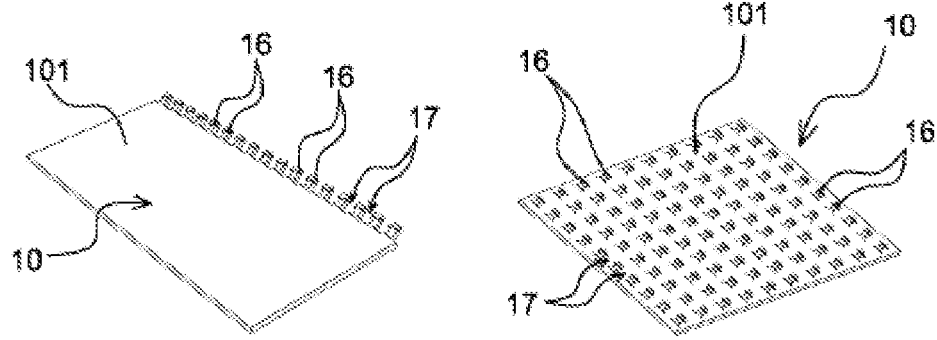
FIGS. 6a and 6b are perspective views of alternative embodiments of teeth produced on one face of the metal part according to the present invention.

As a variant, as illustrated in FIG. 6a, the teeth 16 extend along a zone, in particular a linear zone. The teeth 16 in this case originate, by continuity of material, from a free end edge of the metal part 10 delimiting one side of the part 10. The end edge supporting the teeth 16 extends in the thickness of the part 10 and forms a non-zero angle with the contact face 101. In FIG. 6a, the edge of the metal part 10 is rectilinear, but as a variant it could assume any shape.

Preferably, yet not essentially, the teeth 16 are evenly spaced apart from each other. The interstitial spaces 17 are advantageously configured in the same way as above to retain the fibers 13 between the teeth 16.

In the embodiment of FIG. 6b, the teeth 16 extend along a surface of the metal part 10. The interstitial spaces 17 are configured in the same way as above to retain the fibers 13 between the teeth 16.

Of course, the invention is not limited to the embodiments described above, which are provided solely by way of an example. It encompasses various modifications, alternative embodiments and other variants that may be contemplated by a person skilled in the art within the scope of the present invention, and in particular any combination of the different operating modes described above, which can be taken separately or in combination.

The invention claimed is:

1. A method for assembling a first metal part with a second part made of a composite material comprising at least one matrix and fibers arranged inside the matrix, characterized in that the method comprises at least:
   a step of forming the first metal part, consisting in producing a plurality of teeth projecting from a contact face of the first metal part and comprising a free end, the plurality of teeth originating from an edge of a through opening produced in the first metal part, the plurality of teeth circumferentially arranged around the through opening and extending at least partially radially inwardly toward a center of the through opening, two adjacent teeth of the plurality of teeth being separated from each other by an interstitial space, each of the plurality of teeth having an end protuberance, wherein there is a circumferential alternation between the two adjacent teeth and the interstitial space along the edge of the through opening, the end protuberance having a concave rounded border at the free end of each of the plurality of teeth; and
   a step of pressing the second part against the first metal part, in such a way that the fibers of the composite material can penetrate inside the interstitial spaces defined between the two adjacent teeth of the plurality of teeth, and that the fibers are retained by the end protuberances of the plurality of teeth, wherein the matrix comprises a polymer material comprising at least one of a thermoplastic polymer material, a thermoplastic polycarbonate, polyphenylene sulfide, polyether ether ketone, polyetherimide, polyamide, or a thermosetting polymer material.

2. The assembly method as claimed in claim 1, characterized in that it further comprises:
   a step of heating the second part that is performed before the pressing step; and/or
   a cooling step that is performed after the pressing step.

3. The assembly method as claimed in claim 2, characterized in that the cooling step is performed under pressure.

4. The assembly method as claimed in claim 1, characterized in that a first distance between two oppositely-facing teeth of the plurality of teeth on opposite sides of the through opening is less than a distance between extremes of two oppositely-facing interstitial spaces on opposite sides of the through opening.

5. The assembly method as claimed in claim 1, characterized in each tooth of the plurality of teeth has two opposed sides that are concave relative to one another as the tooth extends from a base to the end protuberance such that the free end of the tooth has a width that is greater than a width of a central part of the tooth and such that the central part of the tooth is less than a width of the base of the tooth.

6. An airplane seat assembly comprising:
   a first metal part; and
   a second part made of a composite material comprising at least one matrix and fibers arranged inside the matrix, characterized in that:
   the first metal part comprises a plurality of teeth, each tooth of the plurality of teeth projecting from a base in connection with a contact face of the first metal part and comprising a free end, opposite the base, having an end protuberance, the plurality of teeth originating from an edge of a through opening produced in the metal part and separated from each other by interstitial spaces, there being a circumferential alternation between the teeth and the interstitial spaces along the edge of the through opening, the plurality of teeth circumferentially arranged around the through opening and extending at least partially radially inwardly toward a center of the through opening, the end protuberance having a concave rounded border at the free end of each of the plurality of teeth; and
   the fibers of the composite material are arranged penetrating inside the interstitial spaces, and the fibers are retained by the end protuberances of the plurality of teeth.

7. The assembly as claimed in claim 6, characterized in that the end protuberance of at least one tooth of the plurality of teeth comprises at least one circumferential protuberance.

8. The assembly as claimed in claim 7, characterized in that the free end of the at least one tooth of the plurality of teeth has a width that is greater than a width of a central part of the at least one tooth of the plurality of teeth.

9. The assembly as claimed in claim 8, characterized in that the width of the central part of the at least one tooth is less than a width of the base of the at least one tooth.

10. The assembly as claimed in claim 6, characterized in that for at least one of the interstitial spaces, the smallest width of the at least one interstitial space is located at the free end of the plurality of teeth.

11. The assembly as claimed in claim 10, characterized in that at least one of the interstitial spaces has at least one contraction in width in a direction of extension of at least one tooth of the plurality of teeth.

12. The assembly as claimed in claim 6, characterized in that at least one tooth of the plurality of teeth is extended by a point arranged at the free end of the at least one tooth of the plurality of teeth.

13. The assembly as claimed in claim 6, characterized in that the first metal part and the second part are parts of an airplane seat.

14. An airplane seat assembly comprising:
    a first metal part; and
    a second part made of a composite material comprising at least one matrix and fibers arranged inside the matrix, characterized in that:
    the first metal part comprises a plurality of teeth, each tooth of the plurality of teeth projecting from a base in connection with a contact face of the first metal part and comprising a free end, opposite the base, having an end protuberance, the plurality of teeth originating from an edge of a through opening produced in the metal part and separated from each other by interstitial spaces, there being a circumferential alternation between the teeth and the interstitial spaces along the edge of the through opening, the plurality of teeth circumferentially arranged around the through opening and extending at least partially radially inwardly toward a center of the through opening, each tooth of the plurality of teeth having two opposed sides that are concave relative to one another as the tooth extends from the base to the end protuberance such that the free end of the tooth has a width that is greater than a width of a central part of the tooth and such that the central part of the tooth is less than a width of the base of the tooth, the end protuberance having a concave rounded border at the free end of each of the plurality of teeth; and
    the fibers of the composite material are arranged penetrating inside the interstitial spaces, and the fibers are retained by the end protuberances of the plurality of teeth.

15. The assembly as claimed in claim 14, characterized in that a first distance between two oppositely-facing teeth of the plurality of teeth on opposite sides of the through opening is less than a distance between extremes of two oppositely-facing interstitial spaces on opposite sides of the through opening.

* * * * *